United States Patent [19]

Kuchmas, Jr. et al.

[11] 4,097,800
[45] Jun. 27, 1978

[54] LASER SCREEN

[75] Inventors: John Kuchmas, Jr., Kearny; Gary E. Bubb, Hackettstown, both of N.J.

[73] Assignee: The United States of America as represented by the Secretary of the Army, Washington, D.C.

[21] Appl. No.: 758,627

[22] Filed: Jan. 12, 1977

[51] Int. Cl.² ............................................. G01P 3/66
[52] U.S. Cl. .................................. 324/178; 250/222 R
[58] Field of Search ............... 324/178, 175; 250/221, 250/222

[56] References Cited

U.S. PATENT DOCUMENTS

| 3,025,406 | 3/1962 | Stewart et al. | 250/222 |
| 3,500,063 | 3/1970 | Reno et al. | 250/222 X |
| 3,584,226 | 6/1971 | Lerner | 250/222 X |

*Primary Examiner*—Rudolph V. Rolinec
*Assistant Examiner*—Vincent J. Sunderdick
*Attorney, Agent, or Firm*—Nathan Edelberg; A. Victor Erkkila; Max Yarmovsky

[57] ABSTRACT

A light screen device for measuring the velocity of a projectile comprising a laser disposed opposite to one end of a first plane reflecting mirror and inclined with respect thereto to cause a laser beam to strike the first plane reflecting mirror and in turn to reflect the beam to a second plane mirror and successively reflecting the beam back and forth vertically to higher points on each mirror surface forming a criss-cross rectangularly shaped light grid network therebetween. A light detector is disposed axially in line with a reflected beam to intercept and detect the continuing presence thereof and to generate a pulse signal in response to the projectile passing through the light screen to stop a counting circuit.

2 Claims, 1 Drawing Figure

U.S. Patent June 27, 1978 4,097,800
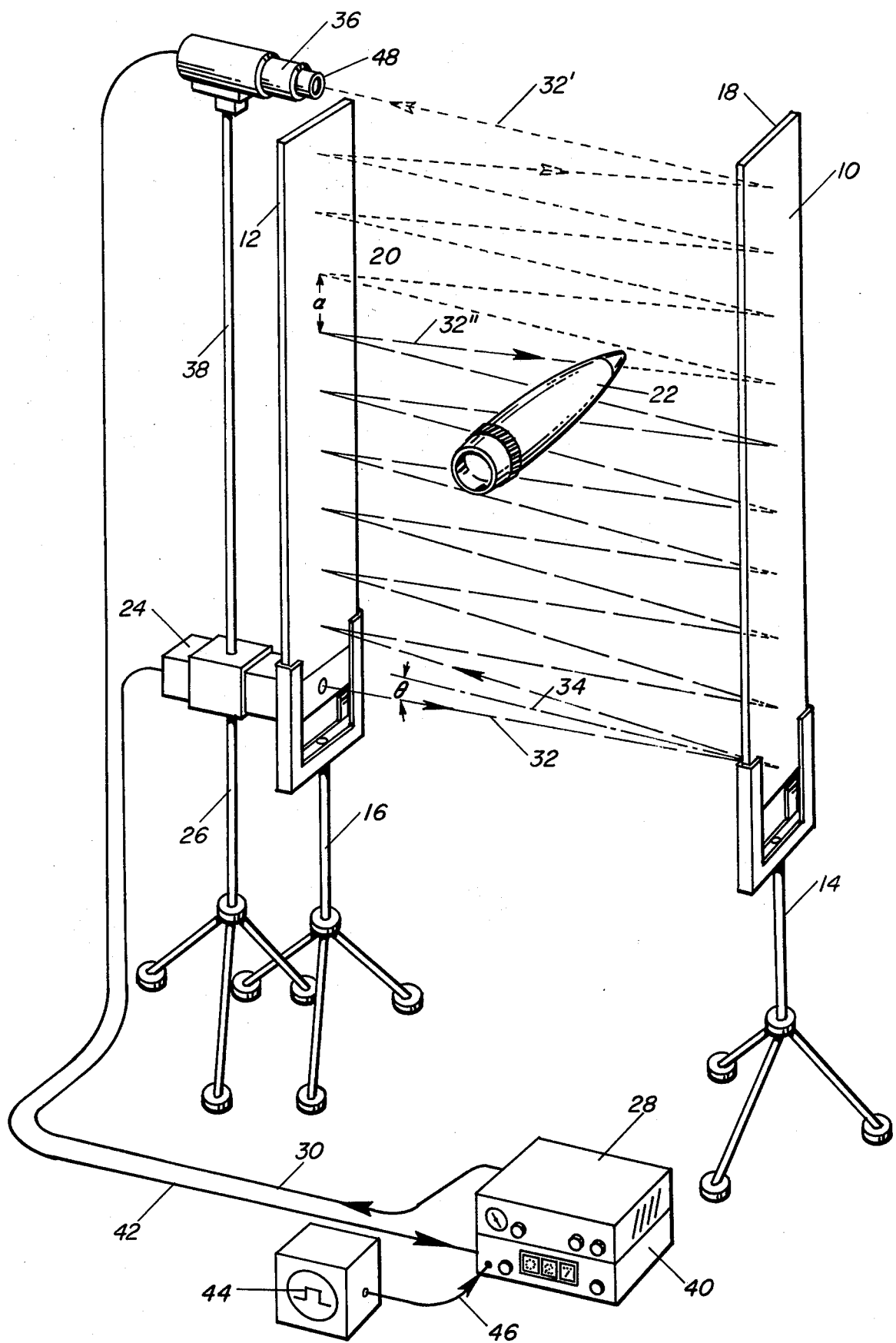

LASER SCREEN

GOVERNMENTAL INTEREST

The invention described herein may be manufactured, used and licensed by or for the Government for governmental purposes without the payment to us of any royalty thereon.

BACKGROUND OF THE INVENTION

Various means have been used in the prior art to determine the velocity of projectiles undergoing development. Some prior art devices utilize large wire coils to insure the clearance of a magnetized projectile passing therethrough. Frequently these large coils had the problem of generating a reduced induced pulse signal. The small pulse signal necessitated the use of more powerful magnets within the projectile to produce a signal capable of being adequately measured. In cases where the projectile being tested was small, it was not possible to change the size of the permanent magnet contained therein. The problem with prior art devices utilizing the break paper technique frequently required a thicker or more supportive arrangement to stop flexing and vibration of the paper by the wind. These large sheets of break paper generally cut down the availability of down range camera coverage of the projectile firing.

SUMMARY OF THE PRESENT INVENTION

The present invention relates to a laser screen device used to test the velocity of experimental projectiles having unstable flight problems. The present invention permits velocity measurements of projectiles having unstable flight trajectories without causing damage to the down range velocity measuring system. The present device may be used to measure the velocity of a projectile regardless of whether the projectile is made of either magnetic or non-magnetic material. The present invention eliminates the need of preflight magnetization preparation of the projectile being velocity tested.

An object of the present invention is to provide a laser screen device for checking the velocity of projectiles having unknown flight characteristics.

Another object of the present invention is to provide a laser screen device for checking the velocity of an unstable flight projectile while protecting the velocity measuring system.

Another object of the present invention is to provide a laser screen device for checking the velocity of a projectile without requiring pre-flight magnetization of the projectile.

Another object of the present invention is to provide a laser screen device for checking the velocity of a projectile which offers the minimum amount of interference with camera coverage of the flight.

Another object of the present invention is to provide a laser screen having a relatively large cross-sectional area for checking the velocity of a projectile having unstable flight trajectories. A further object of the present invention is to provide a laser screen which can determine the velocity of projectiles made of non-ferrous as well as ferrous materials.

For a better understanding of the present invention, together with other and further objects thereof, reference is made to the following descriptions taken in connection with the accompanying drawing.

BRIEF DESCRIPTION OF THE DRAWING

The drawing is an isometric view and block diagram of the laser screen device showing a projectile just as it begins to penetrate the light beam

DESCRIPTION OF THE SPECIFIC EMBODIMENTS

Referring now to the drawing two reflective members, such as first and second rectangularly shaped plane mirrors 10 and 12 respectively, are fixedly held in a vertical position by tripods stands 14 and 16 respectively so that their respective reflecting surfaces 18 and 20 face each other. The mirrors 10 and 12 are parallel to each other and parallel to the line of sight trajectory of a projectile 22 being fired therebetween. A laser 24 supported underneath the second plane mirror 12, by tripod stand 26, is electrically coupled to power supply 28 by electrical conductor 30. Laser 24 generates a monochromatic light beam which is aimed at first plane mirror 10 so that the laser beam 32 is inclined at an angle of incidence $\theta$ with respect to a line 34 which is perpendicular to reflecting surface 18. Laser beam 34 scans the area between the mirrors 10 and 12 by reflecting successively back and forth from mirrors 10 and 12 to form a vertically disposed light grid network therebetween. The distance "d" between points on the mirrors caused by successive reflections can be changed by orienting the inclination of the laser 24 and/or changing the distance between the mirrors 10 and 12. With the size of the projectile 22 being known, the distance "d" is selected so that the projectile 22 has to block the entire laser beam 32 when it passes through the space between the mirrors 10 and 12. A shielded, filtered, light sensitive photodiode type detector 36 is supported above second plane mirror 12 by tripod extension member 38 so that it will be aligned with and intercept laser beam 32 along path 32' after laser beam 32 has made its last reflection from first plane mirror 10. The output of light detector 36 is electrically coupled to the input of a counter circuit 40 by an electrical conductor 42.

In operation when the projectile 22 intercepts laser beam 32" the detector 36 is no longer activated with the energy of the illuminating laser beam 32. As a result of this interference a different potential voltage will be measured by the counter circuit 40 causing it to mark the indicated elapsed time from launch to screen interception. An initial triggering pulse 44, for the counter 40, is supplied by a break-wire firing circuit not shown. Counter circuit 40 is initiated when projectile 22 is fired from a launch weapon not shown. The triggering pulse signal 44 generated by the break-wire firing circuit starts the counter 40 via input lead 46. Since the distance from the launch weapon to the laser screen is known, and can be considered a constant, the velocity of the projectile is proportional to the time measured and can be determined by dividing the known distance by the elapsed time measured by the counter 40.

The light detector 36 can be either a passive type such as a photovoltaic cell, which need only the external energy of the light beam to function, or an active type such as a photodiode which requires additional power to function in response to a light stimuli. In the event that the background light becomes too great compared to the laser beam, a narrow band pass optical filter 48 may be positioned in front of the detector to filter out all wavelengths of visible light, except for the wavelengths corresponding to the laser being used, e.g.

a HeNe laser which has a wavelength of 6328 angstrom would be satisfactory. The potentials generated by the light detector may be monitored by a tape recorder or fed directly into an electrical counter.

The foregoing disclosure and drawings are merely illustrative of the principles of this invention and are not to be interpreted in a limiting sense. We wish it to be understood that we do not desire to be limited to the exact details of construction shown and described for obvious modifications will occur to a person skilled in the art.

Having thus fully described the invention, what is claimed as new and desired to be secured by Letters Patent of the United States is:

1. A laser screen apparatus for measuring the velocity of a projectile which comprises:

laser means for generating a monochromatic light beam which includes;

a laser having a light source emitting at a wavelength of 6328 angstroms;

a power supply electrically coupled to said laser for stimulating said laser to emit said monochromatic light beam;

detector means for sensing the presence of said monochromatic light beam of said laser means and generating an output signal in response to the interruption of said light beam which includes;

a photodiode operatively positioned and aligned to intercept said monochromatic light beam being reflected from a reflecting means, said photodiode having an output electrically connected to a counter means; and a narrow band pass optical filter positioned in front of said photodiode for filtering out all other wavelengths of visible light;

said counter means having an input electrically connected to said detector means for counting the time interval between launch of said projectile and to indicate the interruption of said monochromatic light beam by said projectile;

means for generating an initial triggering pulse for initiating said counter means when said projectile is launched, said counter means indicating the elapsed time, from launch to screen interception, that said projectile takes to travel a fixed distance from launch to said laser screen, said velocity being proportional to said elapsed time, and which may be determined by dividing said fixed distance by said elapsed time measured by said counter means; and said reflecting means positioned intermediate said laser means and said detector means for successively reflecting said monochromatic light beam back and forth to form a vertically disposed light grid network.

2. A laser screen apparatus as recited in claim 1 wherein said reflecting means comprises:

a first rectangularly shaped plane mirror member vertically positioned opposite said laser;

a second rectangularly shaped plane mirror member vertically disposed opposite to said first plane mirror, said first and second plane mirror members having reflecting surfaces oriented to face each other, said first and second plane mirror members being parallel to each other and to the line of sight trajectory of said projectile, said first and second plane mirror members being optically disposed intermediate said laser and said detector means, said monochromatic light beam of said laser being inclined at an angle of incidence $\theta$ with respect to a normal line to said reflecting surface of said first plane mirror, said angle of incidence $\theta$ being of such value to cause said monochromatic light beam by successive reflection to generate a vertically disposed light grid network between said first and second plane mirrors, said reflection of said monochromatic light beam being separated by a distance "$d$", said distance "$d$" being selected to prevent said projectile from passing through said laser screen without intercepting said monochromatic light beam.

* * * * *